United States Patent [19]

Sougawa

[11] Patent Number: 4,989,568
[45] Date of Patent: Feb. 5, 1991

[54] FUEL INJECTION SYSTEM FOR OUTBOARD MOTORS

[75] Inventor: Masafumi Sougawa, Hamamatsu, Japan

[73] Assignee: Sanshin Kogyo Kabushiki Kaisha, Hamamatsu, Japan

[21] Appl. No.: 77,017

[22] Filed: Jul. 22, 1987

Related U.S. Application Data

[63] Continuation of Ser. No. 783,004, Oct. 2, 1985, abandoned.

[30] Foreign Application Priority Data

Nov. 13, 1984 [JP] Japan ................................ 59-237648

[51] Int. Cl.⁵ ...................... F02B 33/04; F02M 39/00
[52] U.S. Cl. ................................ 123/456; 123/73 AD
[58] Field of Search ............. 123/510, 511, 514, 463, 123/467, 456, 73 SC, 73 AD, 73 A, 73 C

[56] References Cited

U.S. PATENT DOCUMENTS

| | | | |
|---|---|---|---|
| 2,599,699 | 6/1952 | Dilworth | 123/514 |
| 2,717,584 | 9/1955 | Upton | 123/73 A |
| 4,142,497 | 3/1979 | Long | 123/456 |
| 4,290,394 | 9/1981 | Frank | 123/73 A |
| 4,450,820 | 5/1984 | Haynes | 123/514 |
| 4,524,744 | 6/1985 | Adams | 123/514 |
| 4,539,965 | 9/1985 | Soltau | 123/514 |
| 4,637,355 | 1/1987 | Odashima | 123/73 AD |
| 4,660,516 | 4/1987 | Baltz | 123/73 A |
| 4,794,889 | 1/1989 | Hensel | 123/73 SC |

FOREIGN PATENT DOCUMENTS 610248 10/1948 United Kingdom ................ 123/514

*Primary Examiner*—Carl Stuart Miller
*Attorney, Agent, or Firm*—Ernest A. Beutler

[57] ABSTRACT

Several embodiments of fuel supply systems for outboard motors and particularly those embodying fuel injection systems and remotely positioned fuel tanks. In each embodiment, a device is incorporated in the power head of the outboard motor for maintaining a uniform pressure of fuel delivery to the fuel injection nozzles by recycling a portion of the fuel back into the fuel system and within the power head. In some embodiments, the fuel is recycled directly into the fuel line before the fuel pump. In others, the fuel is recycled to either a delivery tank or an accumulator chamber.

19 Claims, 4 Drawing Sheets

DECELERATION SWITCH 14 (SIGNAL AT POINT a)

SWITCH SERIES CIRCUIT 18 (SIGNAL AT POINT b)

OUTPUT OF AND GATE 16 (SIGNAL AT POINT c)

OUTPUT OF NOT GATE 17 q OUTPUT OF FF 15

$\bar{q}$ OUTPUT OF FF 15

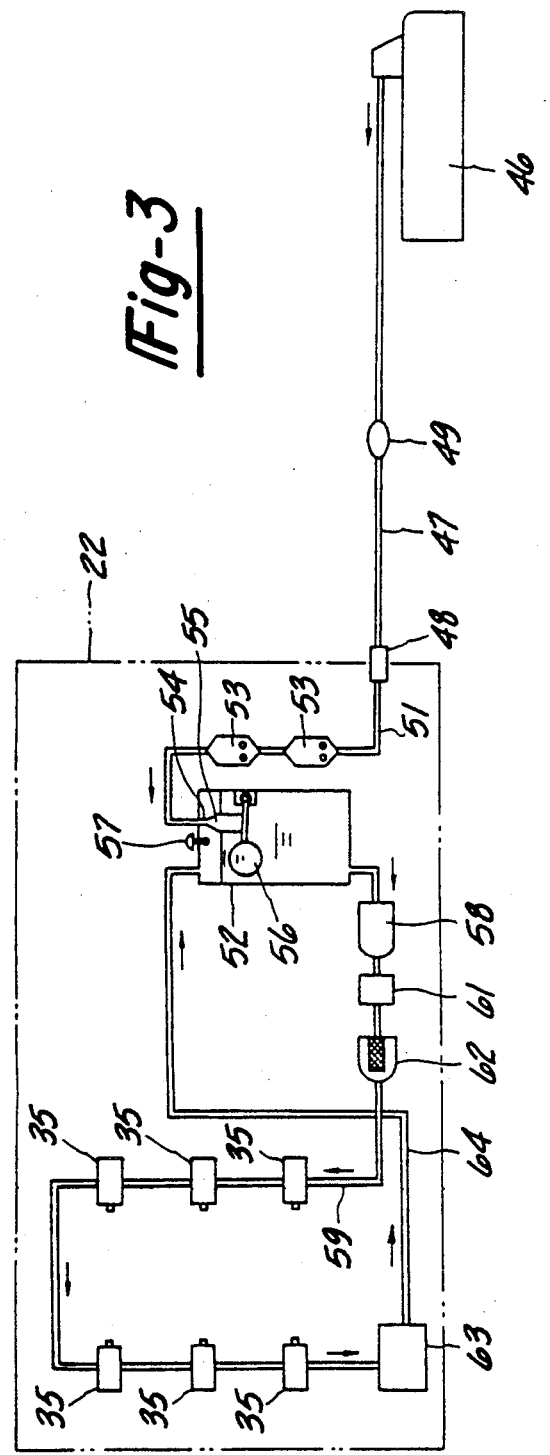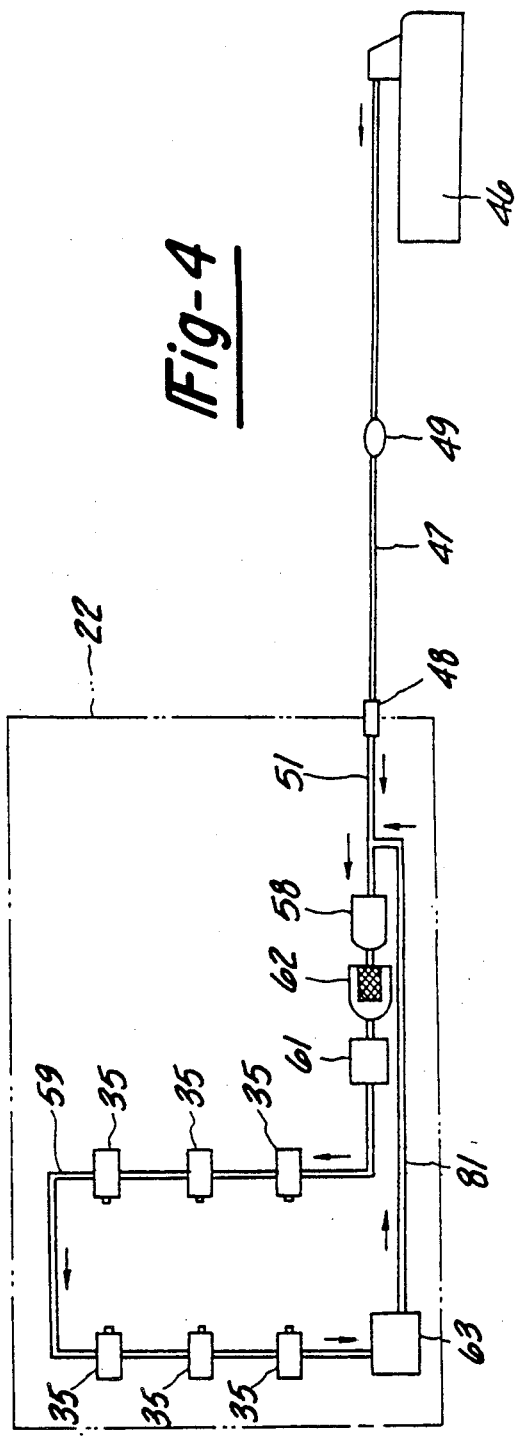

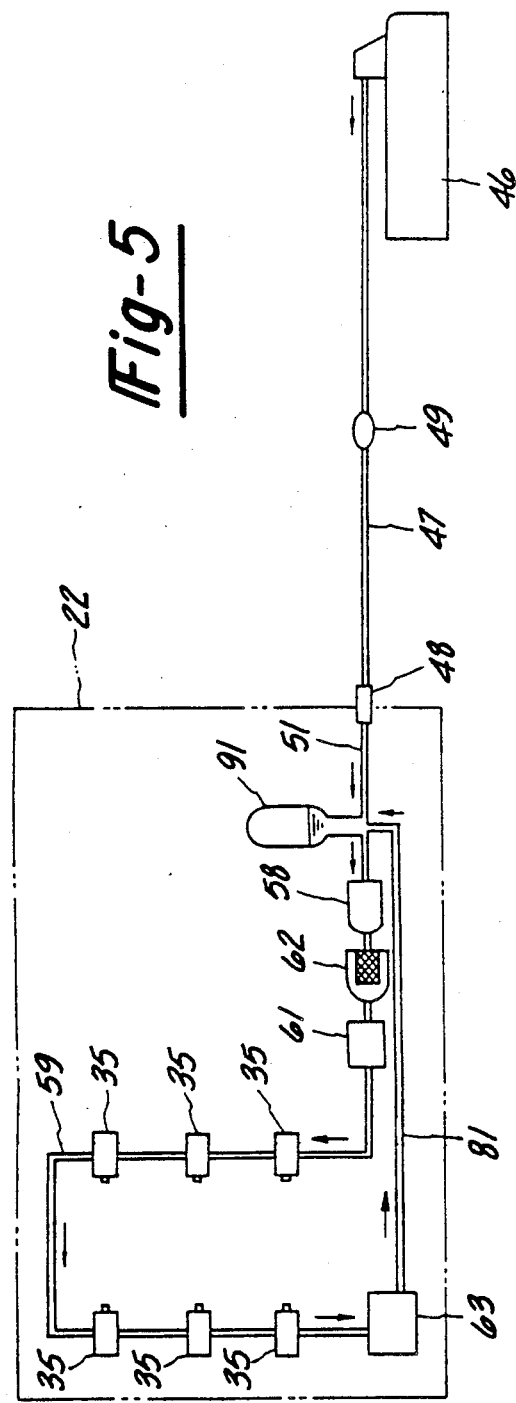
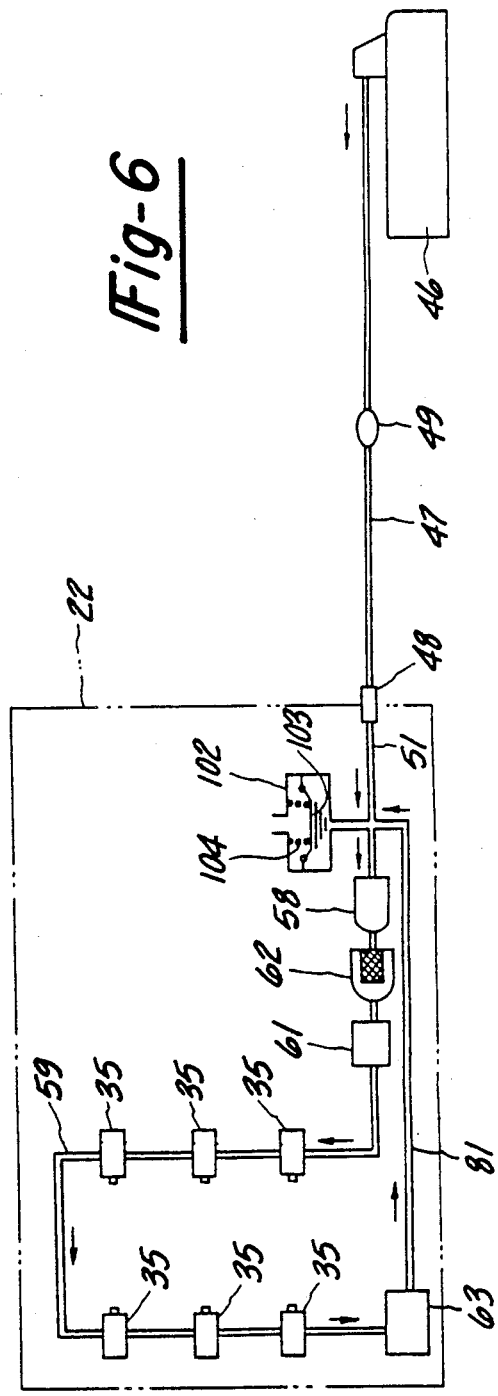

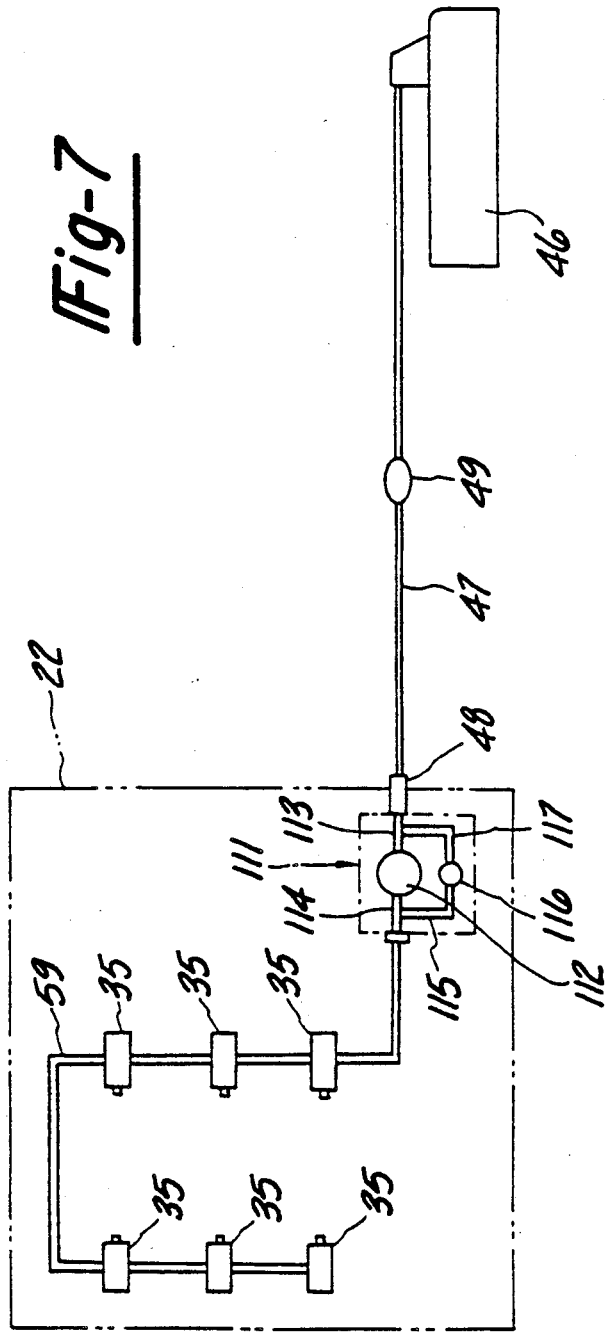

FUEL INJECTION SYSTEM FOR OUTBOARD MOTORS

This is a continuation of U.S. patent application Ser. No. 783,004, filed Oct. 2, 1985, now abandoned.

This invention relates to a fuel injection system for outboard motors and more particularly to an improved fuel supply system for an outboard motor.

In outboard motors and particularly those employing a fuel injection system, it is desirable to insure that the fuel delivered to the charge formers (injectors in the case of an injected engine) be delivered at a substantially constant pressure. Pressure regulating devices have been proposed to achieve this purpose and to improve better running, fuel economy and overall performance. Such pressure regulators maintain a uniform fuel pressure by circulating excess fuel delivered by the fuel pump back to the fuel tank in order to maintain the desired pressure. Frequently, however, an outboard motor is provided with a remotely positioned fuel tank and this fuel tank is coupled o the power head of the outboard motor by a quick disconnect coupling for delivering fuel from the tank to the charge forming system of the engine contained within the power head. With the type of pressure regulating systems previously employed, it has been necessary to return the excess fuel that is bypassed by the regulator back to the fuel tank. This necessitates the use of a separate fuel line running from the power head back to the fuel tank and a separate disconnect connector for this line. Such arrangements provide several disadvantages. First, of course, they increase the cost of the system by requiring the extra fuel conduit and quick disconnect. In addition, there is always the risk that the lines may be either reversed or one of them not connected to result in improper running.

It is, therefore, a principal object of this invention to provide a simplified arrangement for the fuel system for an outboard motor.

It is another object of this invention to provide a pressure regulator arrangement for an outboard motor fuel system wherein the fuel pressure is regulated by returning fuel to a point int eh fuel system other than the fuel tank.

It is a still further object of this invention to provide an improved pressure regulating system for a fuel injecting internal combustion engine as employed in an outboard motor.

SUMMARY OF THE INVENTION

This invention is adapted to be embodied in a fuel supply system for an outboard motor having a power head containing an internal combustion engine, charge forming means for the internal combustion engine, and a fuel tank for supplying fuel to the charge forming means. The fuel tank is positioned remotely from the power head and conduit means supply fuel from the fuel tank to the charge forming means. In accordance with the invention, means are provided within the power head for regulating the pressure of the fuel delivered from the fuel tank to the charge forming means and this includes means for recycling excess fuel back to the fuel supply system of the charge forming means and within the power head.

BRIEF DESCRIPTION OF THE DRAWINGS

FIG. 5 is a schematic view, in part similar to FIGS. 3 and 4, showing a third embodiment of the invention.

FIG. 6 is a schematic view, in part similar to FIGS. 3, 4 and 5, showing a fourth embodiment of the invention.

FIG. 7 is a schematic view, in part similar to FIGS 3, 4, 5 and 6, showing a fifth embodiment of the invention.

DETAILED DESCRIPTION OF THE PREFERRED EMBODIMENTS

Figure 1:
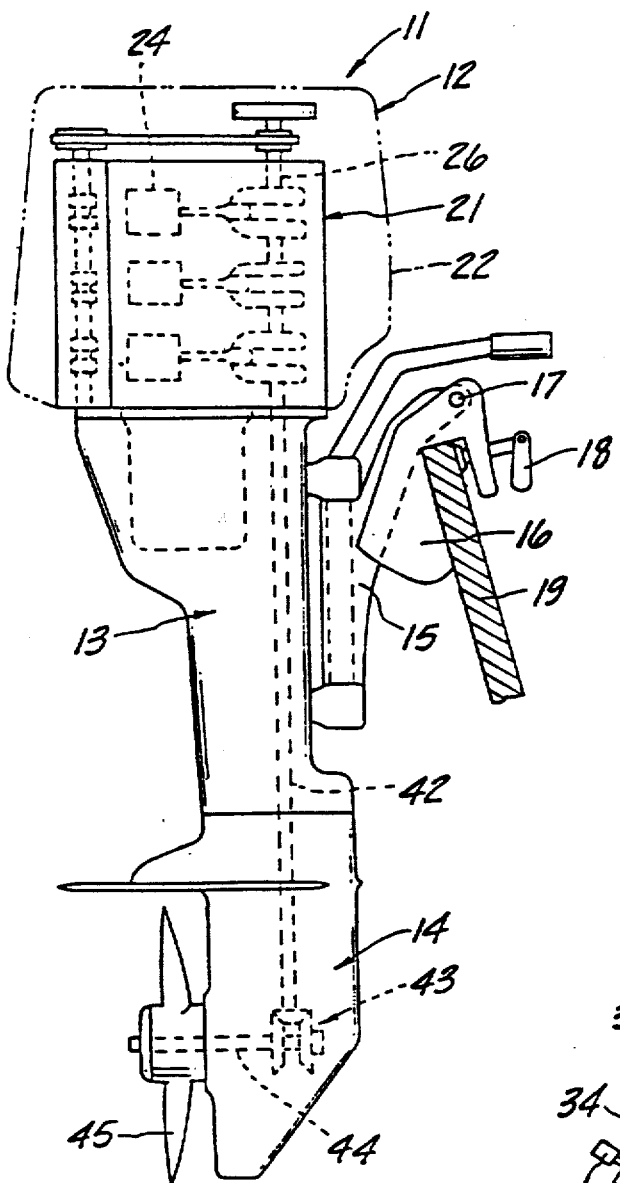
FIG. 1 is a side elevational view of an outboard motor of the type with which the invention may be employed, wherein certain components are shown in phantom.
Figure 2:
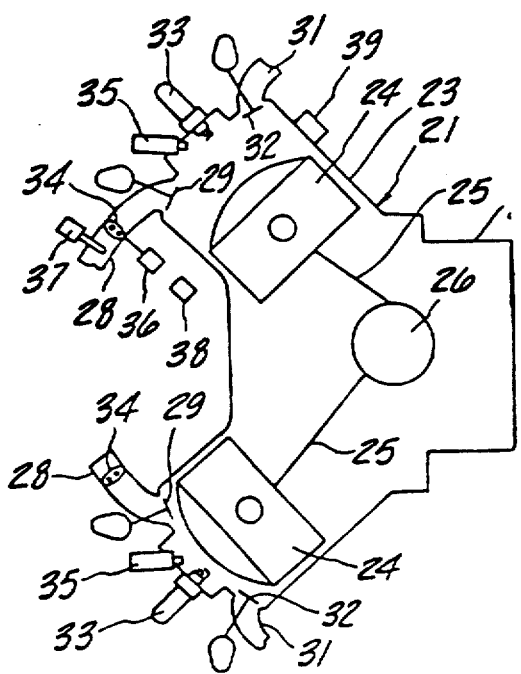
FIG. 2 is a partially schematic horizontal cross-sectional view of the internal combustion engine of the power head.

Referring first to FIGS. 1 and 2, the general construction of an outboard motor having a fuel injection system that may be utilize din conjunction with any of the disclosed embodiments is illustrated and will be described. The outboard motor is identified generally by the reference numeral 11 and includes a power head, indicated generally by the reference numeral 13, and a lower unit, indicated generally by the reference numeral 14. A swivel bracket 15 is connected to the drive shaft housing 13 by means including a steering shaft for steering of the outboard motor 11 about a generally vertically extending axis. The swivel bracket is pivotally connected to a clamping bracket 16 by means of a pivot pin 17 for tilting movement of the outboard motor 11 about a horizontally disposed axis. The clamping bracket 16 includes a clamping device 18 for affixing the outboard motor 11 to a transom 19 of an associate watercraft.

The power head 12 includes an internal combustion engine 21 which may be of any known type and which is contained within a protective outer cowling, which is shown in phantom and is identified by the reference numeral 22. In the illustrated embodiment, the internal combustion engine 21 is of the V6, four-cycle type although the invention may be practiced with other cylinder configurations or two, as well as four, cycle type engines.

The engine 21 is comprised of a cylinder block 23 having angularly disposed cylinder banks that are formed with cylinder bores in which pistons 24 are supported for reciprocation. The pistons 24 are connected by means of connecting rods 25 to drive a crankshaft 26. The crankshaft 26, as is common with outboard motor practice, is rotatably supported about a vertically extending axis and is contained within a crankcase 27.

Inasmuch as the engine 21 in the illustrated embodiment is of the four-cycle type, it is provided with an induction system comprising an induction manifold having individual runners 28 that extend to intake ports formed in a cylinder had of the engine and through which flow is controlled by means of intake valves 29. Exhaust passages 31 extend from each of the combustion chambers and exhaust valves 32 control the flow through the exhaust passages 31. The exhaust passages 31 communicate with an appropriate exhaust manifold (not shown) in a known manner.

A spark plug 33 is provided in the cylinder head for each combustion chamber and is fired in a known manner.

Throttle valves, indicated by the reference numeral 34, are provided in each of the intake manifold runners 28 for controlling the speed of the engine 21 in a known manner. A suitable throttle control linkage (not shown) is incorporated for positioning the throttle valves 34 under operator control.

A charge forming system is provided for the engine 21 which consists of a plurality of injection nozzles 35 which, in the illustrated embodiment, are of the direct injection type and hence spray directly into the combustion chambers of the engine 21. It is to be understood, of course, that the invention may be used with other types of charge formers as well as with engines having port type of injection systems.

The amount of fuel injected by the injectors 35 is controlled by an appropriate control device (not shown) which will vary the fuel delivery in response to a number of sensed engine and external parameters. For this purpose, the engine may be provided with various control sensors such as a throttle position sensor 36, an intake air temperature sensor 37, a atmospheric pressure sensor 38, a coolant temperature sensor 39 and a crankshaft angle sensor 41. These sensors cooperate with an appropriate control module (not shown) in a known manner.

The crankshaft 26 is drivingly coupled to a drive shaft 42 that extends through and is journaled within the drive shaft housing 13. The drive shaft 42 extends into the lower unit 14 and drives a forward, neutral, reverse transmission 43 that is positioned therein for selectively driving a propeller shaft 44 to which a propeller 45 is affixed.

The construction of the outboard motor 11 as thus far described may be considered to be conventional as may its charge forming system and particularly the fuel injection system. For this reason, further details of the construction of these conventional components are believed to be unnecessary.

Figure 3:
FIG. 3 is a schematic view showing the fuel supply system constructed in accordance with a first embodiment of the invention.
Figure 3:
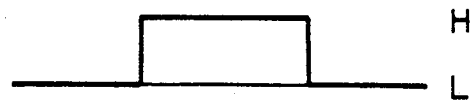
Figure 3:
Figure 3:
Figure 3:
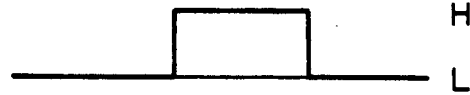
Figure 3:

Referring now to FIG. 3, a first embodiment of a fuel delivery system that may be utilized in conjunction with the outboard motor 11 as thus far described is illustrated in a partially schematic fashion. In this figure, the phantom box indicated by the reference numeral 22 illustrate those components which are located within the power head 12 and specifically within its protective cowling 22. This includes the fuel injection nozzles 35. As is common with outboard motors and particularly those of the large displacement type, a remotely located fuel tank 46 is provided that may be contained within the hull of the associated watercraft. The tank 46 is provided with a supply conduit 47 that extends from the tank and which carries a quick disconnect device 48 for providing a readily detachable connection to a fuel supply conduit 51 contained within the power head protective cowling 22. A manually operated priming pump 49 is provided in the conduit 47.

A small fuel delivery tank 52 is provided within the power head protective cowling 22 and is supplied with fuel from the fuel supply line 51 by mean that includes a pair of pumps 53 that are operated from the engine 21 such as by means of fluctuations in its crankcase pressure. An inlet port 54 is provided at the end of the supply line 51 and cooperates with a needle valve 55 that is operated by means of a float 56 so as to provide a uniform level of fuel head in the delivery tank 52. An atmospheric vent valve 57 of the check valve type is provided at the upper end of the delivery tank 52.

The delivery tank 52 supplies fuel to a high pressure pump 58 which may be driven either by the engine 21 or in a suitable manner for delivering high pressure fuel to a conduit 59 that supplies the individual injection nozzles 35. Interposed between the injection nozzles 35 and the pump 58 is a device 61 for damping pressure variations and a fuel filter 62.

In order to insure good control of the amount of fuel delivered by the nozzles 35, it is desirable to insure that they are supplied with fuel at a constant pressure. Although the pressure damping device 61 will tend to minimize individual or periodic pressure fluctuations, this device cannot insure sufficient pressure regulation for the control purposes. In order to regulate pressure, a pressure regulator 63 is provided in the conduit 59 downstream of the injection nozzles 35. The pressure regulator 63 acts to regulate pressure by diverting a portion of the fuel delivered by the pump 58 back to the source through a conduit 64. That is, the pressure regulator 63 comprises a pressure regulated check valve that opens when the pressure exceeds the desired pressure for the injection nozzles 35 and returns excess fuel through the line 64 to relieve the pressure and maintain it at the regulated amount. In accordance with the invention, the conduit 64 returns fuel to the delivery tank 52 rather than the remotely positioned main fuel tank 46. Thus, no external conduit is required since the excess fuel is delivered back to the fuel system within the protective cowling 22 of the power head 12.

Figure 4:
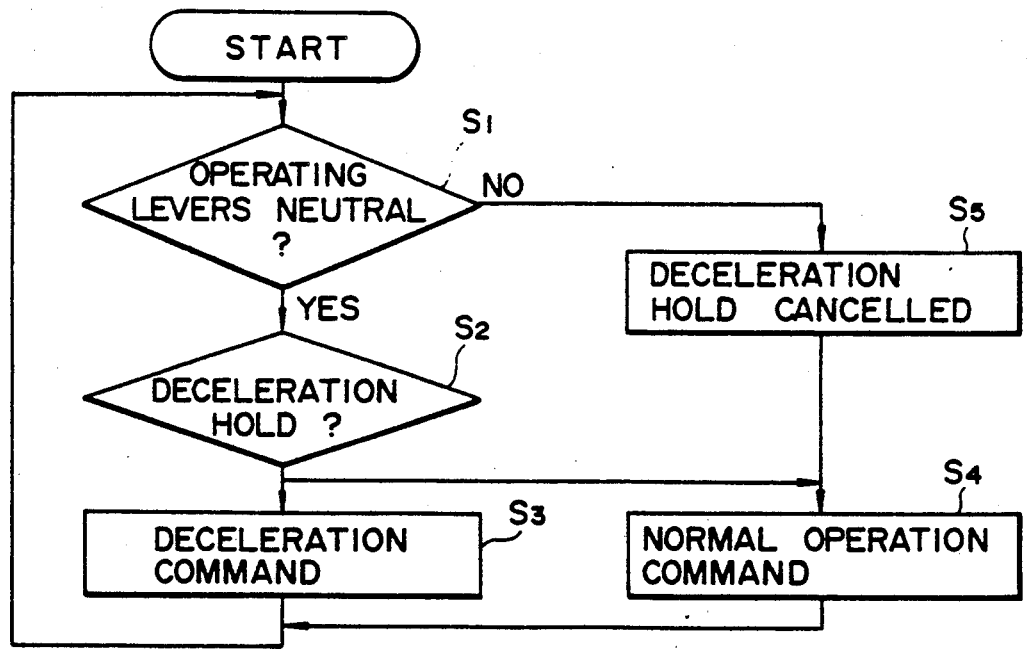
FIG. 4 is a schematic view, in part similar to FIG. 3, showing a second embodiment of the invention.

FIG. 4 shows another embodiment of the invention which is generally similar to the embodiment of FIG. 3 but in which the separate fuel delivery tank 52 within the protective cowling 22 is dispensed with. Because of the similarlity of the construction of this embodiment to the previously described embodiment, components which are the same have been identified by the same reference numeral and will be described again only insofar as is necessary to understand the construction and operation of this embodiment.

In this embodiment, the pressure regulator 63 is also in the line 59 and is disposed downstream of the injection nozzles 35. However, in this embodiment, a return line 81 extends from the pressure regulator 63 to a point in the conduit 51 upstream of the pump 58 rather than to the delivery tank which, as has been noted, is deleted in this embodiment. Except for this variation and the reversal of the location of the damping device 61 and filter 62 in the line 33, the embodiment is the same as the previously described embodiment.

FIG. 5 shows another embodiment which is similar to the embodiment of FIG. 4 in that a fuel delivery tank 52 is not provided within the protective cowling. In this embodiment, however, an accumulator 91 is provided in the conduit 51 between the quick disconnect connector 48 and the fuel pump 58 and the return conduit 81 communicates with the conduit 51 at the mouth of the accumulator 91. Thus, this embodiment like those of FIGS. 2 and 3 provides pressure regulation by return of the fuel within the protective cowling 22.

FIG. 6 shows another embodiment of the invention which is generally similar to the embodiment of FIG. 5 but in which a different form of accumulator is employed. In this embodiment, an accumulator chamber 102 is provided with an internal volume in which a diaphragm 103 is clamped. A coil compression spring 104 is contained within the housing and specifically within an atmospheric chamber on the upper side of the diaphragm 103 so as to urge the diaphragm in a downward direction. The fuel pressure is maintained at the inlet side of the pump 58 by means of the spring 104 and diaphragm 103 with the pressure being generated by the return line 81. Again, the accumulator 102 and pressure regulator 63 are contained within the outer cowling 22.

IN all of the embodiments thus far described, the pressure regulator 63 is positioned in the conduit 59 downstream of the injection nozzles 35. It is to be understood, however, that the pressure regulator may be located anywhere in the line downstream of the pump 58 and FIG. 7 illustrates another alternative location and a construction wherein the overall construction is further simplified.

In this embodiment, a pump is indicated generally by the reference numeral 111 and is interposed between the quick disconnect coupling 48 and the line 59 feeding the injection nozzles 35. The pump 111 includes an integral pressure regulator and return. The pump 111 includes a pumping element 122 that is supplied from an inlet line 113 that communicates with the connector 48 and which discharges through an outlet line 114 into the conduit 59.

A return line 115 extends from the line 114 and internally of the pump 111. A pressure regulator 116 is provided in the return line 115 and is pressure operated so as to return fuel back to the inlet 113 through a return 117 so as to regulate the output pressure of the pump 111 to the desired value. Thus, like all previous embodiments, the pressure regulator and its return are all located within the protective cowling 22.

It should be readily apparent from the foregoing description that the described embodiments all provide a very simple and effective arrangement for maintaining a desired fuel pressure in the fuel line serving the charge forming devices and which minimizes the number of conduits and connections required to the external fuel tank. Although a number of embodiments of the invention have been illustrated and still other described, various additional changes and modifications may be made without departing from the spirit and scope of the invention, as defined by the appended claims.

I claim:

1. An outboard motor fuel supply system, said outboard motor having a power head comprising an internal combustion engine and a surrounding protective cowling, a charge forming means for said internal combustion engine, propulsion means driven by said internal combustion engine from powering an associated watercraft through the water, a fuel tank for supplying fuel to said charge forming means, said fuel tank being positioned remotely from said power head and outside of said protective cowling, and conduit means for supply fuel from said fuel tank to said charge forming means, the improvement comprising pressure responsive valve means contained within said power head for regulating the pressure of fuel delivered from said fuel tank to said charge forming means including means for recycling excess fuel back to said conduit means and within said power head protective cowling.

2. A fuel supply system as set forth in claim 1 wherein the charge forming means comprises a fuel injection nozzle.

3. A fuel supply system as set forth in claim 1 wherein the conduit means includes a quick disconnect coupling between a flexible conduit extending from the fuel tank and the power head.

4. A fuel supply system as set forth in claim 3 wherein the charge forming means comprises a fuel injection nozzle.

5. A fuel supply system as set forth in claim 1 further including pressure pumping means for pumping fuel from the fuel tank to the charge forming means under pressure and the pressure regulating means is positioned upstream of the pressure pumping means.

6. A fuel supply system as set forth in claim 5 further including an auxiliary fuel delivery tank contained within the power head.

7. A fuel supply system as set forth in claim 6 further including float operated valve means for maintaining a uniform level of fuel within said fuel delivery tank.

8. A fuel supply system as set forth in claim 7 wherein the conduit means includes a quick disconnect coupling between a flexible conduit extending from the fuel tank and the power head.

9. A fuel supply system as set forth in claim 8 wherein the charge forming means comprises a fuel injection nozzle.

10. A fuel supply system as set forth in claim 5 wherein the conduit means includes a quick disconnect coupling between a flexible conduit extending from the fuel tank and the power head.

11. A fuel supply system as set forth in claim 10 wherein the charge forming means comprises a fuel injection nozzle.

12. A fuel supply system as set forth in claim 5 further including accumulator means disposed in the conduit means upstream of the pressure pumping means, the means for recycling excess fuel delivering the excess fuel to the accumulator means.

13. A fuel supply system as set forth in claim 12 wherein the conduit means includes a quick disconnect coupling between a flexible conduit extending from the fuel tank and the power head.

14. A fuel supply system as set forth in claim 13 wherein the charge forming means comprises a fuel injection nozzle.

15. A fuel supply system as set forth in claim 12 wherein the accumulator means comprises a closed volume chamber.

16. A fuel supply system as set forth in claim 12 wherein the accumulator means further includes a movable wall and a biasing means for urging the wall against the fuel to maintain a predetermined pressure in the fuel.

17. A fuel supply system as set forth in claim 5 wherein the pressure pumping means has an internal pressure regulator for returning excess fuel to the inlet to the pump.

18. A fuel supply system as set forth in claim 17 wherein the conduit means includes a quick disconnect coupling between a flexible conduit extending from the fuel tank and the power head.

19. A fuel supply system as set forth in claim 18 wherein the charge forming means comprises a fuel injection nozzle. d
* * * * *

UNITED STATES PATENT AND TRADEMARK OFFICE
CERTIFICATE OF CORRECTION

PATENT NO. : 4,989,568

DATED : February 5, 1991

INVENTOR(S) : Masafumi Sougawa

It is certified that error appears in the above-identified patent and that said Letters Patent is hereby corrected as shown below:

Sheet 1 of the drawings, consisting of Figs. 3 and 4, should be deleted to be replaced with the sheet of drawings, consisting of Figs. 1 and 2, as shown on the attached page.

Signed and Sealed this

Twenty-second Day of February, 1994

Attest:

BRUCE LEHMAN

Attesting Officer     Commissioner of Patents and Trademarks

(12) REEXAMINATION CERTIFICATE (4511th)
United States Patent
Sougawa

(10) Number: US 4,989,568 C1
(45) Certificate Issued: Jan. 8, 2002

(54) FUEL INJECTION SYSTEM FOR OUTBOARD MOTORS

(75) Inventor: Masafumi Sougawa, Hamamatsu (JP)

(73) Assignee: Sanshin Kogyo Kabushiki Kaisha, Hamamatsu (JP)

Reexamination Request:
No. 90/003,995, Oct. 10, 1995

Reexamination Certificate for:
Patent No.: 4,989,568
Issued: Feb. 5, 1991
Appl. No.: 07/077,017
Filed: Jul. 22, 1987

Certificate of Correction issued Feb. 22, 1994.

Related U.S. Application Data

(63) Continuation of application No. 06/783,004, filed on Oct. 2, 1985, now abandoned.

(30) Foreign Application Priority Data

Nov. 13, 1984 (JP) ............................................. 59-237648

(51) Int. Cl.[7] .......................... F02B 33/04; F02M 39/00
(52) U.S. Cl. ................................. 123/456; 123/73 AD
(58) Field of Search ........................... 123/456, 73 AD, 123/510, 511, 514, 463, 467, 73 SC, 73 A, 73 C

(56) References Cited

U.S. PATENT DOCUMENTS

| | | |
|---|---|---|
| 2,599,699 A | 6/1952 | Dilworth et al. |
| 2,717,584 A | 9/1955 | Upton |
| 3,548,796 A | 12/1970 | Gastinne |
| 3,688,750 A | 9/1972 | O'Neil |
| 4,062,336 A * | 12/1977 | Gaut ........................... 123/506 |
| 4,142,497 A | 3/1979 | Long |
| 4,290,394 A | 9/1981 | Frank et al. |
| 4,450,820 A | 5/1984 | Haynes |
| 4,524,744 A | 6/1985 | Adams |
| 4,539,965 A | 9/1985 | Soltau |
| 4,549,576 A * | 10/1985 | Angel ..................... 137/614.04 |
| 4,637,355 A | 1/1987 | Odashima |
| 4,660,516 A | 4/1987 | Baltz et al. |
| 4,729,360 A * | 3/1988 | Fehnenbach ................. 123/456 |
| 4,754,740 A | 7/1988 | Emmenthal |
| 4,794,889 A | 1/1989 | Hensel |
| 4,844,704 A * | 7/1989 | Jiro ............................ 417/307 |
| 4,872,531 A * | 10/1989 | Meisenburg ........... 137/614.04 |
| 5,375,579 A | 12/1994 | Kato et al. |
| 5,404,858 A | 4/1995 | Kato |

FOREIGN PATENT DOCUMENTS

| | | |
|---|---|---|
| GB | 610248 | 10/1948 |
| JP | 4940900 | 12/1968 |
| JP | 5312651 | 4/1970 |
| JP | 5025866 | 9/1971 |
| JP | 5236909 | 4/1973 |
| JP | 55137349 | 4/1979 |
| JP | 5615257 | 4/1980 |
| JP | 5830760 | 8/1981 |
| JP | 5898632 | 12/1981 |
| JP | 5937258 | 8/1982 |
| JP | 5984263 | 11/1982 |
| JP | 5890364 | 6/1983 |
| JP | 60224966 | 4/1984 |

* cited by examiner

Primary Examiner—Carl S. Miller

(57) ABSTRACT

Several embodiments of fuel supply systems for outboard motors and particularly those embodying fuel injection systems and remotely positioned fuel tanks. In each embodiment, a device is incorporated in the power head of the outboard motor for maintaining a uniform pressure of fuel delivery to the fuel injection nozzles by recycling a portion of the fuel back into the fuel system and within the power head. In some embodiments, the fuel is recycled directly into the fuel line before the fuel pump. In others, the fuel is recycled to either a delivery tank or an accumulator chamber.

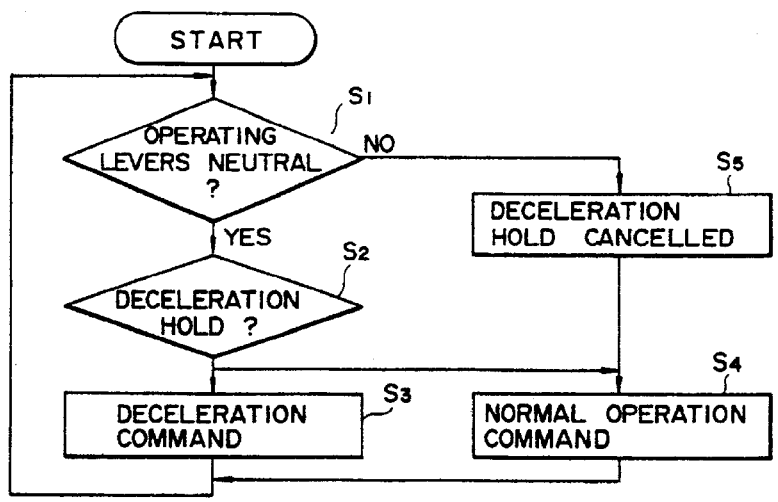

ND US 4,989,568 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 17–19 are cancelled.

Claims 1, 3, 5, 6, 8, 12, 13 and 16 are determined to be patentable as amended.

Claims 2, 4, 7, 9–11, 14 and 15, dependent on an amended claim, are determined to be patentable.

1. An outboard motor fuel supply system, said outboard motor having a power head comprising an internal combustion engine and a surrounding protective cowling, a charge forming means for said internal combustion engine, propulsion means driven by said internal combustion engine [from] *for* powering an associated watercraft through the water, a fuel tank for supplying fuel to said charge forming means, said fuel tank being positioned remotely from said power head and outside of said protective cowling, and *first* conduit means for [supply] *supplying* fuel from said fuel tank to said *power head, second conduit means within said protective cowling for receiving fuel from said first conduit means and delivering the fuel to said* charge forming means, [the improvement comprising] *high pressure pumping means within said protective cowling and in said second conduit means upstream of said charge forming means for pressurizing said fuel in said second conduit means, a volume chamber disposed within said protective cowling in said second conduit means upstream of said high pressure pumping means and* pressure responsive valve means contained within said [power head] *protective cowling and in second conduit means* for regulating the pressure of fuel delivered from [said fuel tank] *high pressure pumping means* to said charge forming means including *third conduit* means for recycling excess fuel back to said [conduit means and] *volume chamber from said pressure responsive valve means, said third conduit means being contained* within said [power head] protective cowling.

3. A fuel supply system as set forth in claim 1 wherein the *first* conduit means includes a quick disconnect coupling between a flexible conduit extending from the fuel tank and the power head.

5. A fuel supply system as set forth in claim 1 [further including] *wherein said* pressure pumping means [for pumping fuel from the fuel tank to the] *is disposed upstream of said* charged forming means [under pressure and the pressure regulating means is positioned upstream of the pressure pumping means].

6. A fuel supply system as set forth in claim 5 [further including] *wherein said volume chamber comprises* an auxiliary fuel delivery tank contained within the power head.

8. A fuel supply system as set forth in claim 7 wherein the *first* conduit means includes a quick disconnect coupling between a flexible conduit extending from the fuel tank and the power head.

12. A fuel supply system as set forth in claim 5 [further including] *wherein said volume chamber comprises* accumulator means disposed in the conduit means upstream of the pressure pumping means, the means for recycling excess fuel delivering the excess fuel to the accumulator means.

13. A fuel supply system as set forth in claim 12 wherein the *first* conduit means includes a quick disconnect coupling between a flexible conduit extending from the fuel tank and the power head.

16. A fuel supply system as set forth in claim 12 wherein the accumulator means further includes a movable wall and [a] biasing means for urging the wall against the fuel to maintain a predetermined pressure in the fuel.

* * * * *